United States Patent
Kawahara et al.

(10) Patent No.: US 10,618,838 B2
(45) Date of Patent: *Apr. 14, 2020

(54) HEAT INSULATING GLASS UNIT FOR VEHICLE

(71) Applicant: AGC Inc., Chiyoda-ku (JP)

(72) Inventors: Hirotomo Kawahara, Chiyoda-ku (JP); Ryota Nakamura, Chiyoda-ku (JP); Kenichi Suzuki, Chiyoda-ku (JP); Nobutaka Aomine, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 32 days.

This patent is subject to a terminal disclaimer.

(21) Appl. No.: 15/727,818

(22) Filed: Oct. 9, 2017

(65) Prior Publication Data

US 2018/0043661 A1  Feb. 15, 2018

Related U.S. Application Data

(63) Continuation of application No. PCT/JP2016/061738, filed on Apr. 11, 2016.

(30) Foreign Application Priority Data

May 11, 2015  (JP) .................................. 2015-096245

(51) Int. Cl.
    *C03C 17/36*  (2006.01)
    *B60J 1/00*   (2006.01)
    (Continued)

(52) U.S. Cl.
    CPC .......... *C03C 17/3655* (2013.01); *B32B 17/06* (2013.01); *B60J 1/00* (2013.01);
    (Continued)

(58) Field of Classification Search
    CPC .............. C03C 17/2453; C03C 17/253; C03C 2217/211; C03C 2217/215;
    (Continued)

(56) References Cited

U.S. PATENT DOCUMENTS

| 3,881,043 A | 4/1975 | Rieser et al. |
| 5,110,637 A | 5/1992 | Ando et al. |

(Continued)

FOREIGN PATENT DOCUMENTS

| GB | 2 324 098 A | 10/1998 |
| JP | 07-210085 | 8/1995 |

(Continued)

OTHER PUBLICATIONS

International Search Report dated Jul. 12, 2016 in PCT/JP2016/061738, filed on Apr. 11, 2016 (with English Translation).

(Continued)

*Primary Examiner* — Z. Jim Yang
(74) *Attorney, Agent, or Firm* — Oblon, McClelland, Maier & Neustadt, L.L.P.

(57) ABSTRACT

A heat insulating glass unit for vehicle includes a glass plate; a color tone compensation film arranged on at least one surface of the glass plate; a transparent conductive layer arranged on the color tone compensation film, and mainly including an indium tin oxide (ITO); and an upper part layer arranged on the transparent conductive layer, a refraction index for a light with a wavelength of 630 nm being 1.7 or less. The color tone compensation film has at least a first layer and a second layer. The first layer is arranged at a position closer to the glass plate than the second layer. A refraction index of the first layer for a light with a wavelength of 630 nm is greater than a refraction index of the second layer for a light with a wavelength of 630 nm.

19 Claims, 6 Drawing Sheets

(51) Int. Cl.
  *C03C 17/34* (2006.01)
  *C03C 17/245* (2006.01)
  *C03C 17/25* (2006.01)
  *B32B 17/06* (2006.01)

(52) U.S. Cl.
  CPC ...... *C03C 17/2453* (2013.01); *C03C 17/2456* (2013.01); *C03C 17/256* (2013.01); *C03C 17/3417* (2013.01); *C03C 17/3435* (2013.01); *B32B 2307/302* (2013.01); *B32B 2307/304* (2013.01); *B32B 2307/412* (2013.01); *B32B 2307/418* (2013.01); *B32B 2309/105* (2013.01); *C03C 2217/734* (2013.01); *C03C 2217/948* (2013.01)

(58) Field of Classification Search
  CPC .. C03C 2217/24–244; C03C 2217/231; C03C 2217/94–948; G02B 1/116
  See application file for complete search history.

(56) References Cited

U.S. PATENT DOCUMENTS

| | | | | |
|---|---|---|---|---|
| 5,318,830 | A * | 6/1994 | Takamatsu | B32B 17/10036 428/216 |
| 5,399,435 | A * | 3/1995 | Ando | B32B 17/10174 428/428 |
| 5,667,880 | A * | 9/1997 | Okaniwa | C03C 17/3417 428/212 |
| 6,165,598 | A * | 12/2000 | Nelson | C03C 17/3417 428/212 |
| 6,309,753 | B1 * | 10/2001 | Grossman | C03C 3/11 428/213 |
| 6,387,515 | B1 | 5/2002 | Joret et al. | |
| 6,797,388 | B1 * | 9/2004 | Szanyi | C03C 17/3417 427/164 |
| 6,924,037 | B1 * | 8/2005 | Joret | B32B 17/10 428/432 |
| 2003/0035939 | A1 * | 2/2003 | Muromachi | B32B 17/10036 428/212 |
| 2004/0005482 | A1 * | 1/2004 | Kobayashi | G02B 1/115 428/702 |
| 2005/0196623 | A1 * | 9/2005 | McKown, Jr. | C03C 17/3417 428/432 |
| 2005/0238857 | A1 | 10/2005 | Day | |
| 2007/0108043 | A1 * | 5/2007 | Lu | C03C 17/2456 204/192.15 |
| 2007/0113881 | A1 * | 5/2007 | Mellott | C03C 3/087 136/243 |
| 2009/0104385 | A1 * | 4/2009 | Reymond | B32B 17/10174 428/34 |
| 2009/0109537 | A1 * | 4/2009 | Bright | G02B 5/287 359/588 |
| 2009/0303602 | A1 * | 12/2009 | Bright | G02B 1/111 359/585 |
| 2010/0285290 | A1 * | 11/2010 | Lu | C03C 17/3417 428/213 |
| 2011/0081532 | A1 * | 4/2011 | Lu | C03C 17/3417 428/216 |
| 2011/0146768 | A1 * | 6/2011 | Lu | C03C 17/3417 136/255 |
| 2013/0025672 | A1 * | 1/2013 | Auvray | C03C 17/3435 136/256 |
| 2013/0038834 | A1 * | 2/2013 | Cado | G02B 1/115 351/159.62 |
| 2013/0129945 | A1 * | 5/2013 | Durandeau | C03C 17/3417 428/34 |
| 2013/0316140 | A1 * | 11/2013 | Lu | C03C 17/3417 428/142 |
| 2013/0329295 | A1 * | 12/2013 | Okuno | G02B 1/116 359/586 |
| 2014/0010976 | A1 * | 1/2014 | Gerardin | C03C 17/3411 428/34 |
| 2014/0021460 | A1 * | 1/2014 | Tanida | H01L 51/5268 257/40 |
| 2014/0087101 | A1 * | 3/2014 | Tixhon | C03C 17/3417 428/34 |
| 2014/0113120 | A1 * | 4/2014 | Thiel | C03C 17/36 428/212 |
| 2014/0141206 | A1 | 5/2014 | Gillard et al. | |
| 2014/0334006 | A1 * | 11/2014 | Adib | G02B 1/105 359/580 |
| 2014/0335332 | A1 * | 11/2014 | Bellman | G02B 1/105 428/212 |
| 2014/0335335 | A1 * | 11/2014 | Koch, III | G02B 1/105 428/213 |
| 2015/0062710 | A1 * | 3/2015 | Grillmayer | H01J 37/3405 359/585 |
| 2015/0146286 | A1 | 5/2015 | Hagen et al. | |
| 2015/0239774 | A1 * | 8/2015 | Lamine | C03C 17/3435 428/213 |
| 2015/0244089 | A1 | 8/2015 | Reul et al. | |
| 2016/0002098 | A1 * | 1/2016 | Sternchuss | C03C 17/3417 428/216 |
| 2016/0002099 | A1 * | 1/2016 | Manz | C03C 17/3417 428/212 |
| 2016/0154254 | A1 * | 6/2016 | Bolshakov | G02B 1/11 351/159.66 |
| 2016/0214887 | A1 * | 7/2016 | Illy | C03C 17/3435 |
| 2016/0229741 | A1 * | 8/2016 | Canova | C03C 17/3423 |
| 2017/0114588 | A1 * | 4/2017 | Fukuda | C03C 17/36 |
| 2017/0204001 | A1 * | 7/2017 | Maillet | G02B 5/285 |
| 2018/0134615 | A1 * | 5/2018 | Burrows | C23C 14/3485 |

FOREIGN PATENT DOCUMENTS

| | | |
|---|---|---|
| JP | 9-188547 | 7/1997 |
| JP | 11-34216 | 2/1999 |
| JP | 03-187737 | 8/2001 |
| JP | 2004-013081 | 1/2004 |
| JP | 2004-149400 | 5/2004 |
| JP | 2011-191338 | 9/2011 |
| JP | 2013-533202 | 8/2013 |
| JP | 2015-512854 A | 4/2015 |
| WO | WO 2005/114271 | 12/2005 |
| WO | WO 2008/123553 | 10/2008 |
| WO | WO 2013/132176 A2 | 9/2013 |
| WO | WO 2014/019780 | 2/2014 |
| WO | WO 2015/033067 A1 | 3/2015 |
| WO | WO-2015055944 A1 * | 4/2015 ......... C03C 17/3423 |

OTHER PUBLICATIONS

Written Opinion dated Jul. 12, 2016 in PCT/JP2016/061738, filed on Apr. 11, 2016.
International Search Report dated Jul. 12, 2016 in PCT/JP2016/061739 (with English translation), 5 pages.
Written Opinion of the International Searching Authority dated Jul. 12, 2016 in PCT/JP2016/061739, 3 pages.
U.S. Appl. No. 15/784,348, filed Oct. 16, 2017, 2018/0043658, Kawahara et al.
Office Action in corresponding patent application No. 201-517831 dated Sep. 17, 2019. (w/English translation).

* cited by examiner

HEAT INSULATING GLASS UNIT FOR VEHICLE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/061738 filed on Apr. 11, 2016 and designating the U.S., which claims priority of Japanese Patent Application No. 2015-096245 filed on May 11, 2015. The entire contents of the foregoing application are incorporated herein by reference.

BACKGROUND OF THE INVENTION

1. Field of the Invention

The disclosure herein generally relates to a heat insulating glass unit for vehicle.

2. Description of the Related Art

Heat insulating glass units that are used for vehicles, such as cars, and that do not lose heat inside vehicles to the outside of the vehicles in winter (Japanese Unexamined Patent Application Publication No. 2004-149400) have been known.

Japanese Unexamined Patent Application Publication No. 2004-149400 discloses a heat insulating glass unit manufactured by forming a multilayered film configured with an indium tin oxide (ITO) and a silica ($SiO_2$) layer on a glass substrate. The heat insulating glass unit disclosed in Japanese Unexamined Patent Application Publication No. 2004-149400 has a feature that a visible light transmittance is high and the heat insulating performance is excellent.

SUMMARY OF THE INVENTION

Technical Problem

However, the above-described heat insulating glass unit has a problem such that color characteristics as viewed exhibit angle dependence. That is, the above-described heat insulating glass unit has a tendency that a color of a reflected light (reflection color) varies by a viewing direction. For example, when the heat insulating glass unit is viewed from a first direction, the heat insulating glass unit appears blue, but when the heat insulating glass unit is viewed from a second direction, the heat insulating glass unit appears yellow. Because the above-described angle dependence of reflection color for the heat insulating glass unit creates a strange impression to a user who views the heat insulating glass unit, it is preferable to control the angle dependence as much as possible.

The present invention was made in view of such a problem, and it is an object of the present invention to provide a heat insulating glass unit in which the angle dependence of reflection color is improved.

Solution to Problem

In the present invention, a heat insulating glass unit for vehicle including a glass plate; a color tone compensation film arranged on at least one surface of the glass plate; a transparent conductive layer arranged on the color tone compensation film, and mainly including an indium tin oxide (ITO); and an upper part layer arranged on the transparent conductive layer, a refraction index for a light with a wavelength of 630 nm being 1.7 or less, the color tone compensation film having at least a first layer and a second layer, the first layer being arranged at a position closer to the glass plate than the second layer, and a refraction index of the first layer for a light with a wavelength of 630 nm being greater than a refraction index of the second layer for a light with a wavelength of 630 nm, is provided.

Advantageous Effect of Invention

According to an aspect of the present invention, a heat insulating glass unit in which angle dependence of reflection color is improved can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, an embodiment of the present invention will be described.

(Heat Insulating Glass Unit for Vehicle According to Embodiment of Present Invention)

Figure 1:
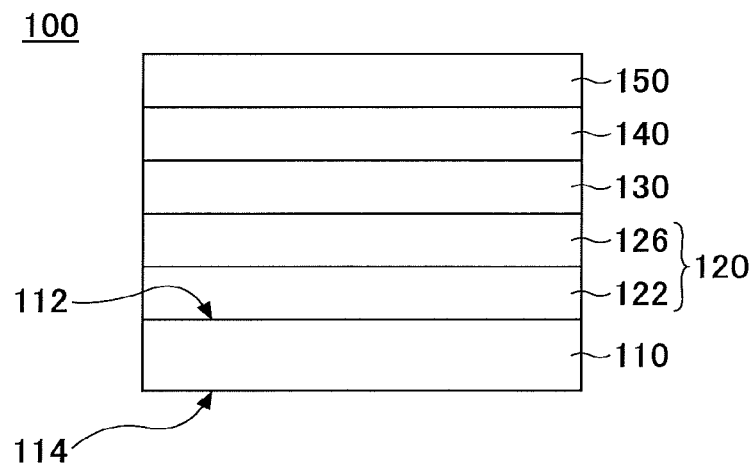
FIG. 1 is a cross sectional diagram schematically depicting a configuration of a heat insulating glass unit for vehicle according to an embodiment of the present invention.

FIG. 1 schematically illustrates a cross section of a heat insulating glass unit for vehicle according to an embodiment of the present invention.

As illustrated in FIG. 1, the heat insulating glass unit 100 includes a glass plate 110, a color tone compensation film 120, a transparent conductive layer 130, an adhesion improving layer 140, and an upper part layer 150.

The glass plate 110 has a first surface 112 and a second surface 114. Respective members (layers), which will be described in the following, are arranged on the first surface 112 side. The glass plate 110 is configured with a single piece of glass, termed as single glass (single sheet of glass or a glass pane).

The color tone compensation film 120 is arranged on the first surface 112 of the glass plate 110. The color tone compensation film 120 has a role of adjusting angle dependence of reflection color of the heat insulating glass unit 100 by controlling a refraction index of one layer or two or more layers included in the color tone compensation film 120.

In Example illustrated in FIG. 1, the color tone compensation film 120 is configured with two layers, i.e. a first layer 122 and a second layer 126 from the side adjacent to the glass plate 110. In the above-described configuration, the first layer 122 has a refraction index greater than that of the second layer 126 for a light with a wavelength of 630 nm.

However, this is merely an example, and the color tone compensation film 120 may be configured with three layers or more.

The transparent conductive layer 130 is arranged above the color tone compensation film 120. The transparent conductive layer 130 is configured with a material mainly including an indium tin oxide (ITO). In the present application, the phrase "layer 'A' mainly includes material 'B'" means that a layer 'A' includes a material 'B' of 50 mass % or more.

The refraction index of the transparent conductive layer 130 for a light with wavelength of 630 nm falls, for example, within a range of 1.7 to 1.8.

The adhesion improving layer 140 is arranged between the transparent conductive layer 130 and the upper part layer 150, and has a role of suppressing an exfoliation at an interface between both layers. The adhesion improving layer 140 is configured, for example, by a metal oxide such as a tin oxide, a zinc oxide, a cerium oxide, and the like. Note that the arrangement of the adhesion improving layer 140 is optional, and the adhesion improving layer 140 may be omitted.

The upper part layer 150 is arranged above the transparent conductive layer 130 (furthermore, when the adhesion improving layer 140 exists, above the adhesion improving layer 140). In the present application, the term "upper part" in the "upper part layer" means being arranged at a far side from the transparent conductive layer 130 with respect to the glass plate 110. Therefore, the expression of the "upper part layer" does not necessarily mean that the upper part layer 150 is oriented as an uppermost layer in the application with respect to the ground.

The upper part layer 150 has a role of protecting the transparent conductive layer 130 and enhancing durability of the heat insulating glass unit 100.

However, the upper part layer 150 is required to be arranged so as not to have adverse effects on color characteristics of the heat insulating glass unit 100 and the angle dependence thereof. Therefore, the upper part layer 150 is configured so that the refraction index for a light with wavelength of 630 nm is 1.7 or less. The upper part layer 150 may be configured, for example, by a material mainly including $SiO_2$.

The heat insulating glass unit 100 having the above-described configuration exerts excellent heat insulating properties. For example, an emissivity of the heat insulating glass unit 100 is 0.45 or less. Therefore, when the heat insulating glass unit 100 is applied to, for example, a side glass, a rear glass, and/or a roof glass of an automobile (in the following, they will be referred to as "glass members" as a whole), it becomes possible to prevent heat inside a vehicle from being released to the outside of the vehicle in winter. Moreover, because according to the low emissivity film, re-radiation to the indoor side is reduced, it becomes possible to prevent the temperature inside the vehicle from increasing in summer.

Moreover, the heat insulating glass unit 100 can significantly control the angle dependence of reflection color according to the color compensation film 120 and further interactions between the color tone compensation film 120, the transparent conductive layer 130, the adhesion improving layer 140, and the upper part layer 150 (arrangement of the adhesion improving layer 140 is optional). Therefore, when the heat insulating glass unit 100 is applied to, for example, glass members of automobiles or the like, it becomes possible to significantly control variation of color characteristics depending on a viewing direction.

Furthermore, because the heat insulating glass unit 100 has the upper part layer 150 that functions as a protection layer, it becomes possible to enhance the durability of the heat insulating glass unit 100. For example, when the heat insulating glass unit 100 is applied to a side glass of an automobile, an occurrence of a scratch when moving the side glass up and down for opening/closing can be reduced significantly.

Especially, when the upper part layer 150 is mainly configured with silica ($SiO_2$) in the heat insulating glass unit 100, even if a thinning (wear) occurs in the upper part layer 150, the effect of controlling variation of reflection color depending on a viewing direction continues to be maintained.

(Respective Members Configuring Heat Insulating Glass Unit for Vehicle According to Embodiment of Present Invention)

Next, respective members configuring the heat insulating glass unit for vehicle according to the embodiment will be described in detail. In the following description, when indicating the respective members, for clarification, the reference numerals used in FIG. 1 will be used.

(Glass Plate 110)

The glass plate 110 of the heat insulating glass unit 100 is not particularly limited, and may be, for example, a soda lime glass, a quartz glass, a borosilicate glass, an alkali-free glass or the like.

Visible light transmittance, solar radiation transmittance, and transmittance for light with wavelength of 1500 nm are preferably 70%-90%, 40%-65%, and 35%-60%, respectively. Moreover, the glass plate 110 may be an ultraviolet protection glass that can shield ultraviolet light. Note that any of the above-described values are obtained by measuring with a measurement method prescribed in JIS.

A shape of the glass plate 110 is not necessarily planar. The glass plate 110 may be curved. Moreover, the glass plate 110 may be colorless or colored. Moreover, a thickness of the glass plate 110 may fall within a range of 2 mm-6 mm, for example.

(Color Tone Compensation Film 120)

The color tone compensation film 120 has a role of adjusting an angle dependence of reflection color of the heat insulating glass unit 100.

As described above, the color tone compensation film 120 is configured with a plurality of layers including at least the first layer 122 and the second layer 126.

In this case, the first layer 122 closer to the glass plate 110 has a greater refraction index for a light with a wavelength of 630 nm than the second layer 126. For example, the first layer 122 has a refraction index for a light with a wavelength of 630 nm that falls within a range of 1.7-2.5. The refraction index of the first layer preferably falls within a range of 1.8-2.3, and more preferably falls within a range of 1.8-2.2.

The second layer 126 has a refraction index for a light with a wavelength of 630 nm that is 1.6 or less. The refraction index of the second layer is preferably 1.55 or less.

The first layer 122 mainly includes an oxide or an oxynitride including at least one of Ti, Nb, Ta, Zn, Al, In, Si, and Zr, for example. Especially, among these, an oxide or an oxynitride including at least one of Ti, Nb and Zn, and In is preferable. The first layer 122 may be, for example, Ti in which silica of 0.1 mass % to 10 mass % is doped.

When the first layer 122 is configured with tin oxide, a crack is likely to occur in the first layer 122 during a subsequent heating process. Therefore, when the manufacturing process of the heat insulating glass unit 100 includes a heat treatment step, it is not preferable to configure the first layer 122 with tin oxide.

A thickness of the first layer 122 falls, for example, within a range of 3 nm-40 nm, and preferably a range of 5 nm-35 nm.

The second layer 126 may also be configured with a material mainly including any of $SiO_2$, SiON, or $MgF_2$, for example.

A thickness of the second layer 126 falls, for example, within a range of 5 nm-50 nm, and preferably a range of 10 nm-45 nm.

(Transparent Conductive Layer 130)

The transparent conductive layer 130 is configured with a material mainly including an indium tin oxide (ITO). ITO has a function of reflecting infrared light.

ITO may include an additive. Such an additive may be, for example, Ga, Zn, Al, Nb, and/or the like.

A mass fraction of tin oxide in the ITO falls within a range of 5%-12.5% of total mass, and preferably falls within a range of 6.5%-11% of total mass. For tin oxide mass fractions of 12.5% or less, resistance tends to decrease as amount of tin oxide increases.

Moreover, the transparent conductive layer 130 may include, in addition to ITO, another material of less than 50 mass % at maximum. Such a material may be, for example, sodium, lead, iron, and/or the like.

A thickness of the transparent conductive layer 130 falls, for example, within a range of 100 nm-200 nm, and preferably a range of 120 nm-170 nm.

A refraction index of the transparent conductive layer 130 for a light with a wavelength of 630 nm typically falls within a range of 1.7-1.8.

The transparent conductive layer 130 may be configured by, for example, depositing an amorphous ITO layer on the color tone compensation film 120, and crystallizing the layer. According to the crystallization, a heat treatment temperature falls, for example, within a range of 80° C.-170° C. By the above-described method, an ITO layer with a low resistance can be obtained.

(Adhesion Improving Layer 140)

The adhesion improving layer 140 is arranged as necessary. By arranging the adhesion improving layer 140, a peel strength may be enhanced between the transparent conductive layer 130 and the upper part layer 150.

The adhesion improving layer 140 may be configured with a metallic oxide such as tin oxide, zinc oxide, cerium oxide and/or the like.

A thickness of the adhesion improving layer 140 falls, for example, within a range of 1 nm-10 nm.

(Upper Part Layer 150)

The upper part layer 150 is arranged in order to protect a layer existing below the upper part layer 150, e.g. the transparent conductive layer 130 (and/or the adhesion improving layer 140). For example, by arranging the upper part layer 150 above the transparent conductive layer 130 (and/or the adhesion improving layer 140), it becomes possible to enhance an oxidation resistance of the transparent conductive layer 130 (and/or the adhesion improving layer 140). Moreover, by arranging the upper part layer 150, an abrasion resistance is enhanced, and it becomes possible to control an occurrence of a thinning (wear), a crack or the like in the transparent conductive layer 130 (and/or the adhesion improving layer 140).

Moreover, when the upper part layer 150 is arranged appropriately, it becomes possible to enhance the transmittance in the visual light range of the heat insulating glass unit 100.

The upper part layer 150 is preferably configured with a material with a refraction index, for a light with a wavelength of 630 nm, of 1.7 or less, and more preferably a material with a refraction index of 1.55 or less. Such a material includes silica ($SiO_2$), SiON, and $MgF_2$. The upper part layer 150 may be a layer mainly including, for example, silica. In this case, it is possible to enhance heat resistance of the transparent conductive layer 130. Moreover, in the case of the layer mainly including silica, even if a thinning (wear) occurs in the upper part layer 150, it is still possible to maintain the same effect of controlling the angle dependence of reflection color as the heat insulating glass unit 100 in the initial period.

The upper part layer 150 may be, for example, a layer of silica in which zirconia is doped (zirconia-doped silica). A dope amount of zirconia with respect to the entire upper part layer 150 preferably falls within a range of 5 mol %-40 mol %, for example. Moreover, the upper part layer 150 may have a multilayered configuration. Typically, the upper part layer 150 can have a multilayered configuration including a first upper part layer outside and a second upper part layer inside. The first upper part layer includes preferably at least one selection from a group including ZrBO, $ZrO_2$, $Ta_2O_5$, $Al_2O_3$, $TiO_2$, $Nb_2O_5$, SiN, and BN. The second upper part layer is preferably $SiO_2$. For example, preferably, the multilayered configuration includes an inner layer (second upper part layer) mainly including $SiO_2$, and an outer layer (first upper part layer) of ZrBO.

A thickness of the upper part layer 150 preferably falls, for example, within a range of 20 nm-100 nm. The thickness of the upper part layer 150 more preferably falls, for example, within a range of 20 nm-60 nm. When the thickness of the upper part layer 150 is 60 nm or less, as described below, an effect whereby it becomes relatively easier to control reflection color from the heat insulating glass unit 100 can be obtained.

(Heat Insulating Glass Unit 100)

The heat insulating glass unit 100 preferably has an emissivity that falls within a range of 0.1-0.45. In the heat insulating glass unit 100 having such an emissivity, it becomes possible to significantly decrease the heat transmission coefficient for light with wavelengths of infrared and far-infrared.

Note that, in the embodiment, reflection color from the heat insulating glass unit 100 is represented by CIE1976 L*a*b color space (Illuminant D65, field of view of 2°).

Especially, the heat insulating unit 100 according to the embodiment has a feature that a color space of a reflected light generated when a light enters with an incident angle within a range of 0°-80° is included in a region of −5≤a*≤0 and −7.5≤b*≤4. Therefore, in the heat insulating glass unit 100, it is possible to significantly control the angle dependence of reflection color.

The heat insulating glass unit 100 can be applied, for example, to a glass member of a vehicle. Such a glass member may be, for example, a front windshield, a rear windshield, a side glass, and a roof glass.

When the heat insulating glass unit 100 is used as a front windshield, the heat insulating glass is combined with another glass plate via an intermediate film to prepare a laminated glass. In such a case, the heat insulating glass is arranged on a vehicle interior surface of the intermediate film, and used so that a coating surface such as the transparent conductive layer is directed to the vehicle interior side. Therefore, heat inside the vehicle can be prevented from dissipating to the outside of the vehicle, and heat of solar light absorbed outside the vehicle and by the intermediate film can be prevented from entering the vehicle.

Furthermore, the heat insulating glass unit of the embodiment can also be applied to a window glass of a building, or a glass member of a refrigerating apparatus, a freezer, a show case, and the like.

When the heat insulating glass unit according to the embodiment is mounted on a vehicle, the heat insulating glass unit is arranged so that a surface on which a film is formed is the vehicle interior side. According to the above-described configuration, the heat insulating glass unit in which the angle dependence is improved can be provided. In addition, the heat insulating glass unit may also be mounted so that the surface on which the film is formed is the vehicle exterior side. According to the above-described configuration, the angle dependence of the heat insulating glass unit is improved, and a heat shield effect can further be obtained.

(Manufacturing Method of Heat Insulating Glass Unit for Vehicle According to Embodiment)

Next, with reference to FIG. 2, an example of a manufacturing method of a heat insulating glass unit for vehicle according to the embodiment of the present invention having the above-described features will be described. In the following, as an example, the heat insulating glass unit 100 illustrated in FIG. 1 is employed and a manufacturing method thereof will be described.

Figure 2:
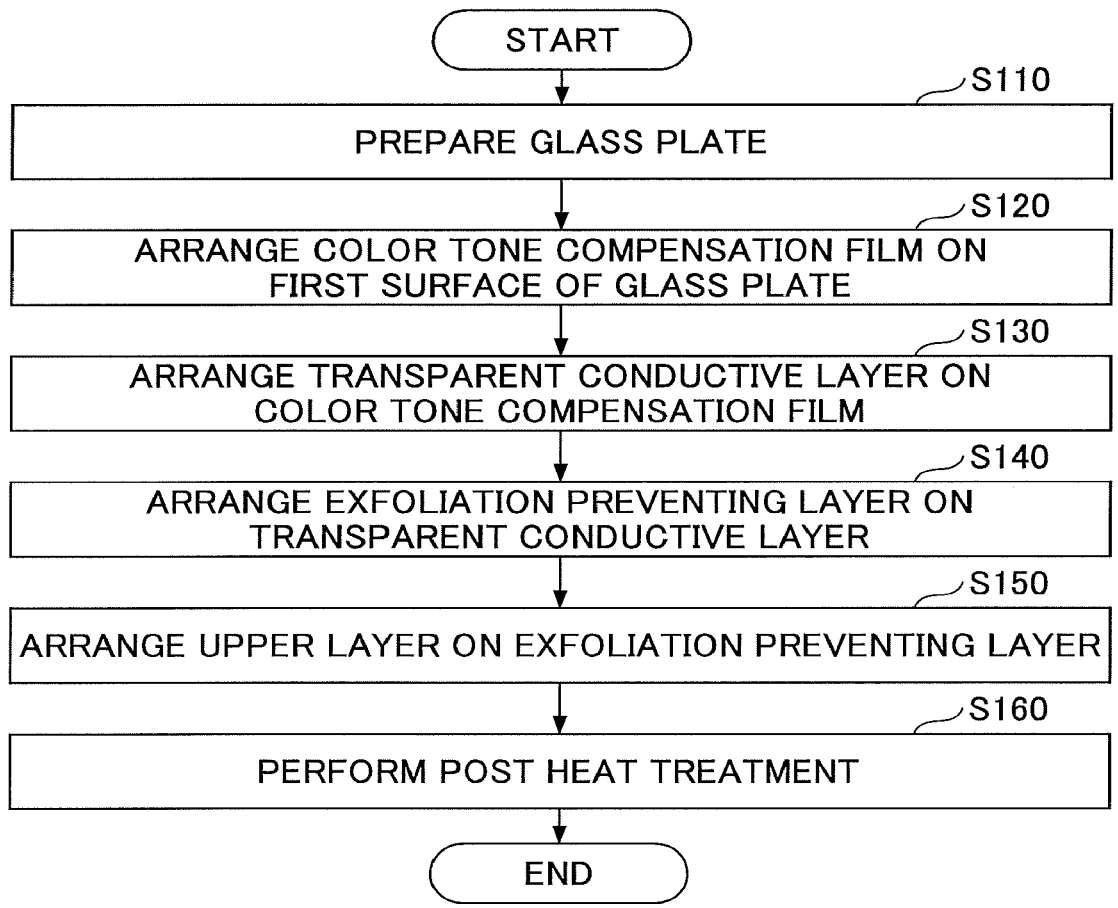
FIG. 2 is a diagram schematically illustrating an example of a flowchart of a manufacturing method for the heat insulating glass unit for vehicle according to the embodiment of the present invention.

FIG. 2 schematically illustrates an example of a flow of the manufacturing method of the heat insulating glass unit for vehicle according to the embodiment.

As illustrated in FIG. 2, the manufacturing method includes a step of preparing a glass plate (step S110), a step of arranging a color tone compensation film on a first surface of the glass plate (step S120), a step of arranging a transparent conductive layer above the color tone compensation film (step S130), a step of arranging an adhesion improving layer above the transparent conductive layer (step S140), a step of arranging an upper part layer above the adhesion improving layer (step S150), and a step of performing a post heat treatment (step S160). The step S140, i.e. arranging the adhesion improving layer may be omitted. Similarly, the step S160, i.e. the post heat treatment may be omitted.

In the following, the respective steps will be described in detail. Note that in the following description, when indicating the respective members, for clarification, the reference numerals used in FIG. 1 will be used.

(Step S110)

First, a glass plate 110, i.e. a single glass plate is prepared.

As described above, a composition of the glass plate 110 is not particularly limited, and the glass plate 110 may be configured with a soda lime glass, a quartz glass, a borosilicate glass, or an alkali-free glass.

(Step S120)

Next, a color tone compensation film 120 is arranged on a first surface 112 of the glass plate 110.

As described above, the color tone compensation film 120 may be formed of a plurality of layers including a first layer 122 and a second layer 126. Among them, the first layer 122 that is closer to the glass plate 110 is preferably configured with a material mainly including an oxide or an oxynitride including at least one of Ti, Nb, Ta, Zn, Al, In, Si, and Zr, for example. The first layer 122 may be, for example, a layer mainly including a titanium oxide in which silica is doped (silica-doped titania). The second layer 126 may be a layer mainly including silica.

The first layer 122 and the second layer 126 are formed, for example, by a sputtering method, a vacuum evaporation method, an ion plating method, a chemical vapor phase film deposition method, or a wet film deposition method, or the like. The first and second layers 122, 126 are preferably formed by using a sputtering method. This is because an environmental burden of the sputtering method is small and a layer obtained by the sputtering method has a relatively uniform thickness.

The sputtering method includes a DC sputtering method, an AC sputtering method, a DC pulse sputtering method, a high frequency sputtering method, a high frequency superposition DC sputtering method, and the like. As the sputtering method, a magnetron sputtering method may be employed.

The first layer 122 is deposited with a thickness of, for example, 3 nm-40 nm, and the second layer 126 is deposited with a thickness of, for example, 5 nm-35 nm.

(Step S130)

Next, a transparent conductive layer 130 mainly including ITO is arranged on the color tone compensation film 120.

The transparent conductive layer 130 may be deposited by using various sputtering methods in the same way as the case of the color tone compensation film 120. When the transparent conductive layer 130 is an ITO layer, upon depositing the transparent conductive layer 130 by a sputtering method, the glass plate 110 is not preferably heated during the deposition. For example, a temperature of the glass plate 110 during the deposition of the ITO layer by a sputtering method is preferably 100° C. or less.

The heat treatment temperature for crystallization falls, for example, within a range of 80° C.-170° C. According to this method, an ITO layer with low resistance can be obtained.

Note that the above-described heat treatment (in the following, referred to as a "crystallization heat treatment") may be performed after deposition for all layers (See step S160, which will be described later).

(Step S140)

Next, an adhesion improving layer 140 is preferably arranged on the transparent conductive layer 130. The adhesion improving layer 140 is configured with, for example, a metallic oxide, such as cerium oxide, zinc oxide or the like.

The method of forming the adhesion improving layer 140 is not particularly limited.

The adhesion improving layer 140 may be formed by directly depositing metallic oxide using a conventional method such as various sputtering methods. The metallic oxide may be, for example, zinc oxide, or cerium oxide.

Alternatively, the adhesion improving layer 140 may be formed, for example, by depositing a metallic film using a conventional method such as a sputtering method, and then oxygenizing the metallic film. The metallic film may be, for example, zinc or cerium.

In the latter case, the oxidation treatment for a metallic film may be performed in the same process as for the crystallization heat treatment for ITO in the previous step (step S130). Alternatively, the oxidation treatment for the metallic film may be performed after deposition for all layers (See step S160, which will be described later).

Note that Step S140 may be omitted.

(Step S150)

Next, an upper part layer 150 is arranged. The upper part layer 150 is arranged on the adhesion improving layer 140 when the adhesion improving layer 140 is present, and is arranged on the transparent conductive layer 130 when the adhesion improving layer 140 is not present. The upper part layer 150 may be configured with a material mainly including silica.

The upper part layer 150 may be deposited using various sputtering methods in the same way as the case of the other layers, such as the color tone compensation film 120.

(Step S160)

After forming the upper part layer 150, the entire glass plate 110 may be subjected to the heat treatment (referred to as a "post heat treatment"). Accordingly, the transparent conductive layer 130 and the upper part layer 150 can be formed to be of few defects. However, it is optional whether the post heat treatment is performed. For example, in the above-described step S130, when the crystallization heat treatment has already been performed, the post heat treatment can be omitted.

The post heat treatment is performed, for example, in air at a temperature of 550° C. to 750° C., for about 1 minute to 30 minutes.

When the heat insulating glass unit 100 is applied to a front windshield for vehicle or the like, a bending process is performed for the heat insulating glass unit 100, obtained as above. This process is typically performed by means of performing the heat treatment for the heat insulating glass unit 100. The temperature of the heat treatment typically falls within a range of 550° C.-750° C.

The heat treatment temperature for the bending process overlaps with the temperature of the above-described post heat treatment. Therefore, the post heat treatment and the heat treatment of the bending process may be performed simultaneously.

When the post heat treatment is performed at Step S160, it is not preferable to configure the first layer 122 of the color tone compensation film 120 with tin oxide. This is because when the first layer 122 is configured with tin oxide, a breakage or a crack is likely to occur in the first layer 122 after the heat treatment.

According to the above-described processes, the heat insulating glass unit 100 can be manufactured. Note that on the upper part layer 150, another layer (for example, alumina, tantalum oxide, silicon nitride, zircon-boron oxide, and the like) may be formed.

As described above, the manufacturing method of the heat insulating glass unit 100 has been described briefly. However, the above-described manufacturing method is merely an example, and it is obvious for a person skilled in the art that the heat insulating glass unit according to the embodiment of the present invention can be manufactured by another manufacturing method.

EXAMPLE

Next, examples of the present invention will be described.

Example 1

A sample of the heat insulating glass unit (referred to as a "sample 1") was manufactured with a method described as follows.

First, a glass plate with a thickness of 3.5 mm (UVFL: by Asahi Glass Company, limited) was prepared. Next, by a sputtering method, on a surface of the glass plate, as the first layer of the color tone compensation film, titanium oxide including silica (amount of silica was 8 mass %)(refraction index for a light with a wavelength of 630 nm was 2.1537) was deposited. For the deposition, a silica-doped titania target with the amount of silica of 8 mass % was used, and a targeted film thickness was 10 nm.

Next, by a sputtering method, on the first layer (silica-doped titania layer), as the second layer of the color tone compensation film, a silica layer (refraction index for a light with a wavelength of 630 nm was 1.4620) was deposited. A targeted film thickness was 35 nm.

Next, by a sputtering method, on the color tone compensation film (silica-doped titania layer and silica layer), as the transparent conductive layer, an ITO layer was deposited. The targeted film thickness was 150 nm. Note that upon deposition, the glass plate was not heated. According to the above-described operation, an amorphous ITO layer was obtained. At a later time, an ITO layer that was crystallized by the post heat treatment (refraction index at a wavelength of 630 nm was 1.7606) was formed.

Next, by a sputtering method, on the ITO layer (transparent conductive layer), as the upper part layer, a silica layer (refraction index at a wavelength of 630 nm was 1.4620) was deposited. A targeted film thickness was 55 nm.

Afterwards, as the post heat treatment, the glass plate was heated at 650° C. for 7 minutes.

According to the above-described processes, the sample 1 was obtained.

Example 2

A sample of the heat insulating glass unit (referred to as a "sample 2") was manufactured using the same method as Example 1.

In Example 2, the thickness of the silica layer as the upper part layer was 95 nm. The other conditions were the same as in the case of Example 1.

Example 3

A sample of the heat insulating glass unit (referred to as a "sample 3") was manufactured using the same method as Example 1.

In Example 3, as the upper part layer, a silica layer in which zirconia is doped (zirconia-doped silica layer)(refraction index at a wavelength of 630 nm was 1.6831) was deposited. A dope amount of zirconia was 33 mol % of the upper part layer. A targeted thickness of the upper part layer was 60 nm. The other conditions were the same as in the case of Example 1.

Comparative Example 1

A sample of the heat insulating glass unit (referred to as a "sample 4") was manufactured with a method described as follows.

First, a glass plate with a thickness of 3.5 mm (UVFL: by Asahi Glass Company, limited) was prepared. Next, by a sputtering method, on a surface of the glass plate, as the transparent conductive layer, an ITO layer was deposited. A targeted film thickness was 150 nm. Note that upon deposition the glass plate was not heated. According to the above-described operation, an amorphous ITO layer was obtained.

Next, by a sputtering method, on the ITO layer (transparent conductive layer), as the upper part layer, a silica layer was deposited. A targeted film thickness was 80 nm.

Afterwards, as the post heat treatment, the glass plate was heated at 650° C. for 7 minutes.

According to the above-described processes, the sample 4 was obtained.

Comparative Example 2

A sample of the heat insulating glass unit (referred to as a "sample 5") was manufactured using the same method as the comparative example 1.

In the comparative example 2, as the upper part layer, a silica layer in which zirconia is doped (zirconia-doped silica layer) was deposited. A dope amount of zirconia was 33 mol % with respect to the upper part layer. A thickness of the upper part layer was 80 nm. The other conditions were the same as in the case of the comparative example 1.

Comparative Example 3

A sample of the heat insulating glass unit (referred to as a "sample 6") was manufactured using the same method as the comparative example 1.

In the comparative example 3, the thickness of the ITO layer (transparent conductive layer) was 135 nm. Moreover, as the upper part layer, by a sputtering method, a silicon nitride layer (refraction index at a wavelength of 630 nm was 2.0898) was formed. A thickness of the upper part layer was 46 nm. The other conditions were the same as in the case of the comparative example 1.

Example 4

A sample of the heat insulating glass unit (referred to as a "sample 7") was manufactured using the same method as Example 1.

In Example 4, the upper part layer had a two-layered configuration including a ZrBO (first upper part layer) and $SiO_2$ (silica)(second upper part layer). A thickness of the ZrBO layer was 30 nm, and a thickness of the silica layer was 30 nm. The other conditions were the same as in the case of Example 1.

TABLE 1, in the following, shows the layer configurations of the samples 1 to 7 as a whole.

TABLE 1

| | | layer configuration | | | | |
|---|---|---|---|---|---|---|
| | | color tone compensation film | | transparent | exfoliation | upper |
| sample | glass plate | first layer | second layer | conductive layer | preventing layer | part layer |
| 1 | UVFL (3.5 mm) | silica doped titania (10 nm) | silica (35 nm) | ITO (150 nm) | — | silica (55 nm) |
| 2 | UVFL (3.5 mm) | silica doped titania (10 nm) | silica (35 nm) | ITO (150 nm) | — | silica (95 nm) |
| 3 | UVFL (3.5 mm) | silica doped titania (10 nm) | silica (35 nm) | ITO (150 nm) | — | zirconia doped silica (60 nm) |
| 4 | UVFL (3.5 mm) | — | — | ITO (150 nm) | — | silica (80 nm) |
| 5 | UVFL (3.5 mm) | — | — | ITO (150 nm) | — | zirconia doped silica (80 nm) |
| 6 | UVFL (3.5 mm) | — | — | ITO (135 nm) | — | SiN (80 nm) |
| 7 | UVFL (3.5 mm) | silica doped titania (10 nm) | silica (35 nm) | ITO (150 nm) | — | ZrBO (30 nm) and silica (30 nm) |

(Evaluation)

Next, using the respective samples 1 to 7, the following characteristic evaluation was performed.

(Angle Dependence of Reflection Color)

Using the respective samples, by the following method, the angle dependence of reflection color was evaluated.

Using a spectrometer (V570ARM-500N by JASCO Corporation), irradiating with a visible light (wavelength of 300 nm to 800 nm) at a predetermined angle (5° to 80°) from the upper part layer side, an obtained reflection color was measured.

The obtained reflection color was indicated in the CIE 1976 L*a*b color space (Illuminant D65, 2° field of view).

Results of measurements for the samples 1 to 7 are shown in the following TABLEs 2 to 8. An incident angle (°) is an inclination angle of the incident light from a line normal to the upper part layer of the sample.

TABLE 2

| incident angle (°) | reflection color | | |
|---|---|---|---|
| | L* | a* | b* |
| 5 | 29.4104 | −0.2838 | 0.4924 |
| 10 | 29.5065 | −0.4782 | 0.6940 |
| 20 | 29.8473 | −1.0733 | 1.2237 |
| 30 | 30.6226 | −2.0198 | 1.8058 |
| 40 | 32.2829 | −3.0349 | 1.9549 |
| 50 | 35.7801 | −3.6026 | 1.3318 |
| 60 | 42.7509 | −3.4406 | 0.3346 |
| 70 | 55.1763 | −3.0007 | −0.0799 |
| 80 | 74.2192 | −2.5774 | 0.2089 |

TABLE 3

| incident angle (°) | reflection color | | |
|---|---|---|---|
| | L* | a* | b* |
| 5 | 23.0132 | −3.8486 | −0.8822 |
| 10 | 22.9372 | −3.4854 | −0.9276 |
| 20 | 22.8461 | −2.5119 | −0.9308 |
| 30 | 23.2005 | −1.4169 | −0.4883 |
| 40 | 24.8881 | −1.0786 | 0.7672 |
| 50 | 29.2543 | −1.9809 | 2.3162 |
| 60 | 37.8924 | −3.3718 | 2.8467 |
| 70 | 52.2314 | −4.1470 | 2.1860 |
| 80 | 72.8599 | −3.6967 | 1.3260 |

TABLE 4

| incident angle (°) | reflection color | | |
|---|---|---|---|
| | L* | a* | b* |
| 5 | 34.2601 | −0.7842 | −0.4275 |
| 10 | 34.2691 | −0.7771 | −0.3620 |
| 20 | 34.3626 | −0.8659 | −0.1052 |
| 30 | 34.7633 | −1.2903 | 0.4082 |
| 40 | 35.9419 | −2.1549 | 0.9889 |
| 50 | 38.8159 | −3.1337 | 1.1193 |
| 60 | 44.9727 | −3.5994 | 0.5264 |
| 70 | 52.4892 | −3.4076 | −0.1439 |
| 80 | 74.7779 | −2.8291 | −0.1215 |

TABLE 5

| incident angle (°) | reflection color | | |
|---|---|---|---|
| | L* | a* | b* |
| 5 | 27.3255 | −12.2460 | 7.1272 |
| 10 | 27.2673 | −12.4006 | 6.6553 |
| 20 | 27.1343 | −12.6015 | 5.0701 |
| 30 | 27.1347 | −12.1423 | 2.1664 |
| 40 | 27.9165 | −10.2384 | −1.6169 |
| 50 | 30.9563 | −6.9386 | −4.7776 |
| 60 | 38.4900 | −3.9022 | −5.5075 |
| 70 | 52.3888 | −2.7444 | −3.6606 |
| 80 | 72.9586 | −2.5889 | −1.2039 |

TABLE 6

| incident angle (°) | reflection color | | |
|---|---|---|---|
| | L* | a* | b* |
| 5 | 38.5657 | −11.9248 | 19.4326 |
| 10 | 38.5527 | −12.4030 | 19.1721 |
| 20 | 38.5193 | −13.6114 | 18.0436 |
| 30 | 38.5383 | −14.8826 | 15.3076 |
| 40 | 38.9440 | −15.1993 | 10.6412 |
| 50 | 40.7040 | −13.5868 | 4.9450 |
| 60 | 45.7857 | −10.1409 | 0.3657 |
| 70 | 56.7360 | −6.6476 | −1.2071 |
| 80 | 74.9056 | −4.2210 | −0.4363 |

TABLE 7

| incident angle (°) | reflection color | | |
|---|---|---|---|
| | L* | a* | b* |
| 5 | 50.0499 | −8.5970 | −8.0217 |
| 10 | 49.8595 | −8.3277 | −8.5218 |
| 20 | 49.3200 | −7.4922 | −9.9067 |

TABLE 7-continued

| incident angle (°) | reflection color | | |
|---|---|---|---|
| | L* | a* | b* |
| 30 | 48.5652 | −6.0497 | −11.8062 |
| 40 | 47.9539 | −4.0798 | −13.5334 |
| 50 | 48.3068 | −1.9870 | −14.0281 |
| 60 | 51.2493 | −0.6308 | −12.0047 |
| 70 | 59.3700 | −0.8873 | −6.9663 |
| 80 | 75.2344 | −2.0748 | −1.2982 |

TABLE 8

| incident angle (°) | reflection color | | |
|---|---|---|---|
| | L* | a* | b* |
| 5 | 31.4478 | −1.3521 | −0.8262 |
| 10 | 31.4427 | −1.2724 | −0.7724 |
| 20 | 31.5064 | −1.1625 | −0.5236 |
| 30 | 31.9025 | −1.3373 | 0.0636 |
| 40 | 33.1758 | −2.0370 | 0.8784 |
| 50 | 36.3390 | −3.0404 | 1.3684 |
| 60 | 43.0296 | −3.6623 | 1.0894 |
| 70 | 55.2322 | −3.5664 | 0.5395 |
| 80 | 74.1712 | −2.9066 | 0.4168 |

Figure 3:
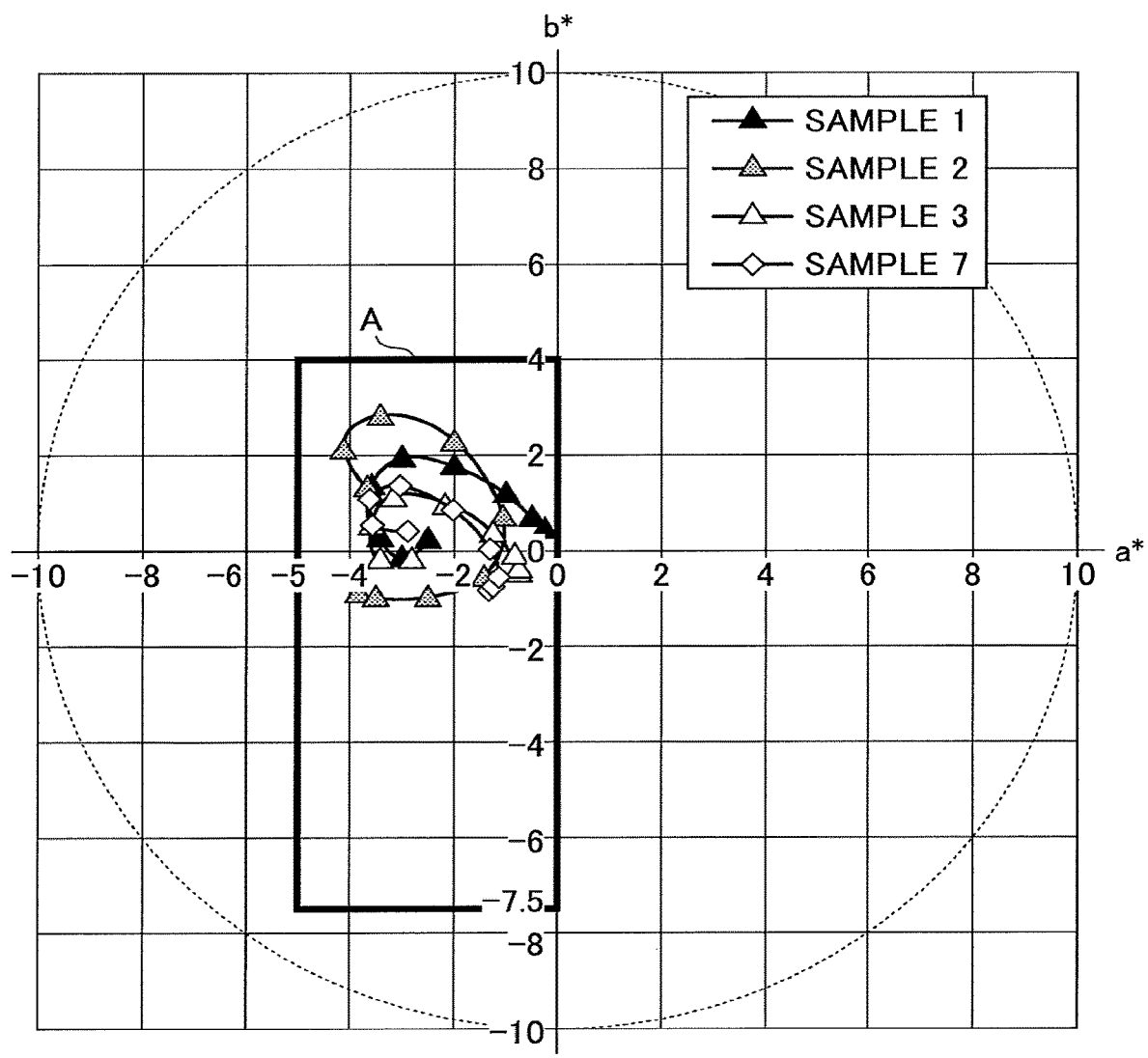
FIG. 3 is a diagram in which reflection colors occurring when irradiating with a light at respective incident angles are plotted in color coordinates in a color space for Samples 1-3 and 7.

FIG. 3 illustrates reflection color, which is generated upon irradiating with light at the respective incident angles, plotted in color coordinates in the color space for the samples 1-3, and 7. Similarly, FIG. 4 illustrates reflection color, which is generated upon irradiating with light at the respective incident angles, plotted in color coordinates in the color space for the samples 4-6.

Figure 4:
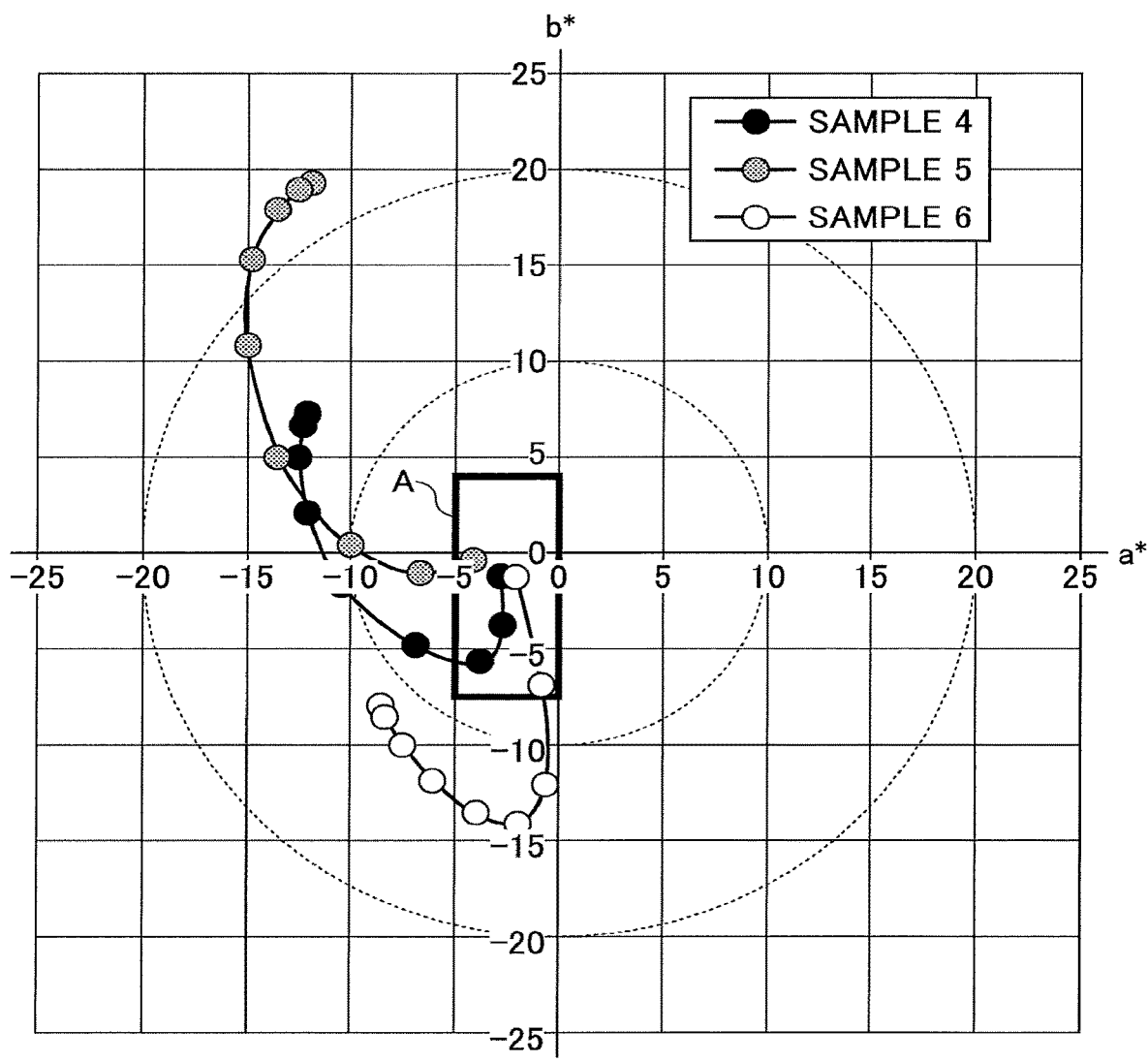
FIG. 4 is a diagram in which reflection colors occurring when irradiating with a light at respective incident angles are plotted in color coordinates in the color space for Samples 4-6.

In FIG. 3 and FIG. 4, for the respective samples, variations in the reflection color occurring when the light incident angle changes from 5° to 70° can be grasped quantitatively. Especially, in the case where irrespective of the incident angle, any colors of the reflection light reflected at a heat insulating glass unit are included in a region "A", it can be said that in the heat insulating glass unit the angle dependence of reflection color is significantly controlled.

The region "A" is defined as a range where a* is −5 to 0, and b* is −7.5 to 4. The region "A" is defined as a region that does not create a strange impression from the reflection color, based on experiences of the inventors of glass members for vehicles. Typically, in the case of a glass member for vehicle, as the reflection color, colors near white to light blue tend to be preferred to colors of white to pink. Therefore, the region "A" tends to be rather broad on the side of the light blue region (lower left region of the origin.

From FIG. 3, is was found that for the samples 1-3, and the sample 7, even if the incident angle changes from 5° to 70°, the color coordinates of the reflection color remain inside the region "A". Therefore, it was confirmed that for the samples 1-3, the angle dependence of reflection color from samples was significantly controlled.

In FIG. 4, it is found that for the samples 4-6, when the incident angle changes from 5 to 70, the color coordinates of reflected light greatly deviate from the region "A", and tend to be distributed in an upper left region greatly deviated from the origin (region of strong yellow to yellow-green). Therefore, it was confirmed that for the samples 4-6, the angle dependence of reflection color from samples was great, and there was a problem of a strange impression created upon being viewed.

(Measurement of Visible Light Reflectance, Visible Light Transmittance, and Emissivity)

Next, using the samples 1-3, and the sample 7, a visible light reflectance, a visible light transmittance, and emissivity were measured.

For the measurement, a spectrophotometer (U4100: by Hitachi, limited) was used. The respective samples are irradiated with light from the upper part layer side. Within a range of wavelength of light of 300 nm to 2500 nm, a visible light reflectance and a visible light transmittance for the respective samples were measured. The measurement was performed in compliance with JIS A5759.

An emissivity for the samples (hemispheric emissivity) was measured by using an emissivity meter (TSS-5X: by Japan Sensor Corporation).

Results of measurement obtained for the sample 1 are shown in TABLE 9 as a whole:

TABLE 9

| incident angle (°) | visible light reflectance (%) | visible light transmittance (%) | hemispheric emissivity |
|---|---|---|---|
| 0 | 6.3 | 75.4 | 0.16 |

Results of measurement obtained for the sample 2 are shown in TABLE 10 as a whole:

TABLE 10

| incident angle (°) | visible light reflectance (%) | visible light transmittance (%) | hemispheric emissivity |
|---|---|---|---|
| 0 | 4.9 | 77.2 | 0.17 |

Results of measurement obtained for the sample 3 are shown in TABLE 11 as a whole:

TABLE 11

| incident angle (°) | visible light reflectance (%) | visible light transmittance (%) | hemispheric emissivity |
|---|---|---|---|
| 0 | 7.7 | 73.7 | 0.16 |

Results of measurement obtained for the sample 7 are shown in TABLE 12 as a whole:

TABLE 12

| incident angle (°) | visible light reflectance (%) | visible light transmittance (%) | hemispheric emissivity |
|---|---|---|---|
| 0 | 6.8 | 74.8 | 0.17 |

From the above-described results, it is found that any of the visible light reflectance, the visible light transmittance and the emissivity for the samples 1-3 and 7, is within a proper range as a heat insulating glass unit for vehicle. In this way, it is found that the samples 1-3 and 7 can be applied to a glass member for vehicle.

Example 5

A sample of the heat insulating glass unit (referred to as a "sample 8") was manufactured using the same method as Example 1.

In Example 5, a glass plate with a thickness of 4.0 mm (VFL: by Asahi Glass Company, limited) was used, and an adhesion improving layer of zinc oxide (thickness of 5 nm) was formed between the ITO layer and the upper part layer. The adhesion improving layer was formed by a general sputtering method.

Moreover, a thickness of the first layer was 8.3 nm, a thickness of the second layer was 41 nm, a thickness of the ITO layer (transparent conductive layer) was 154 nm, and a thickness of the upper part layer was 55.5 nm.

Example 6

A sample of the heat insulating glass unit (referred to as a "sample 9") was manufactured using the same method as the above-described example 3.

In Example 6, a glass plate with a thickness of 4.0 mm (VFL: by Asahi Glass Company, limited) was used. A thickness of the first layer was 9.5 nm, a thickness of the second layer was 38 nm, a thickness of the ITO layer (transparent conductive layer) was 154 nm, and a thickness of the upper part layer was 58 nm.

TABLE 13, in the following, shows the layer configurations of the samples 8 and 9 as a whole:

TABLE 13

| | layer configuration | | | | | |
|---|---|---|---|---|---|---|
| sample | glass plate | color tone compensation film | | transparent conductive layer | exfoliation preventing layer | upper part layer |
| | | first layer | second layer | | | |
| 8 | UVFL (3.5 mm) | silica doped titania (8.3 nm) | silica (41 nm) | ITO (154 nm) | zinc oxide (5 nm) | silica (55.5 nm) |
| 9 | UVFL (3.5 mm) | silica doped titania (9.5 nm) | silica (38 nm) | ITO (154 nm) | — | zirconia doped silica (60 nm) |

(Evaluation)

Next, using the samples 7 to 9, the following characteristic evaluation was performed.

(Evaluation of Influence from Abrasion Resistance of Coated Layer and Thinning of Upper Part Layer)

An effect on reflection color from changes (decreases) of the abrasion resistance of samples or the thickness of the upper part layer was evaluated.

First, using a Taber's abrasion test apparatus, an upper part layer of samples was abraded. A sample was arranged horizontally on an apparatus table, so that the upper part layer of the sample was directed upward. Then, with a load of 4.9 N from above, an abraded surface of the apparatus (abrasion wheel: C1800XF) was pressed against the sample. In this state, the sample was abraded by rotating the abrading surface of the apparatus at 1000 rotations.

Reflection colors were measured by the above-described method using the samples 7 to 9 before and after the Taber's test (incident angle was 5°). Moreover, using a hazemeter (MODEL Hz-2: by Suga Test Instruments Co., Ltd.), a total light transmittance and a haze ratio for the samples 7 to 9 before and after the abrading Taber's test were measured.

TABLE 14, in the following, shows results of evaluation for the samples 7 to 9 as a whole.

TABLE 14

| sample | | Total light transmittance (%) | chromaticity coordinate | | | distance between coordinates | Haze value |
|---|---|---|---|---|---|---|---|
| | | | L* | a* | b* | | |
| sample 7 | before abrading | 76.37 | 31.61 | −0.09 | −2.92 | | 0.10 |
| | after abrading | 74.16 | 33.74 | 0.41 | −2.20 | | 1.17 |
| | Difference | −2.21 | 2.13 | 0.50 | 0.72 | 2.30 | 1.06 |
| sample 8 | before abrading | 78.1 | 31.24 | −1.26 | −4.47 | | 0.06 |
| | after abrading | 76.5 | 32.47 | −1.26 | −4.23 | | 0.98 |
| | difference | −1.6 | 1.23 | 0.00 | 0.24 | 1.25 | 0.92 |
| sample 9 | before abrading | 75.0 | 35.84 | −2.62 | 0.65 | | 0.10 |
| | after abrading | 72.9 | 37.09 | −2.01 | −0.35 | | 1.32 |
| | difference | −2.1 | 1.25 | 0.62 | −1.00 | 1.71 | 1.22 |

In TABLE 14, an item of "distance between coordinates" indicates a difference between color coordinates before abrasion process and color coordinates after abrasion process. Therefore, a small distance between coordinates means a small change in the color coordinates before and after the abrasion process.

Figure 5:
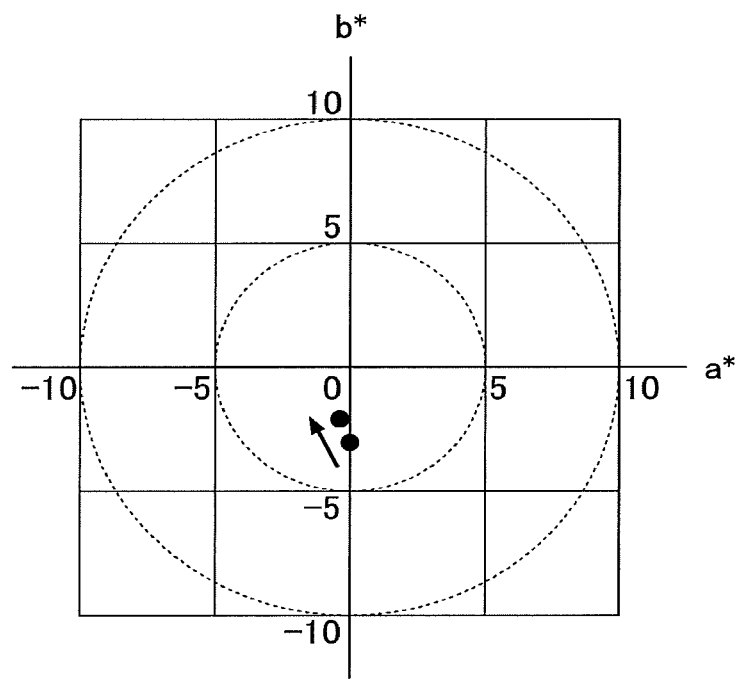
FIG. 5 is a diagram in which reflection colors before and after an abrasion process for the upper part layer are plotted in color coordinates in the color space for Sample 7.
Figure 6:
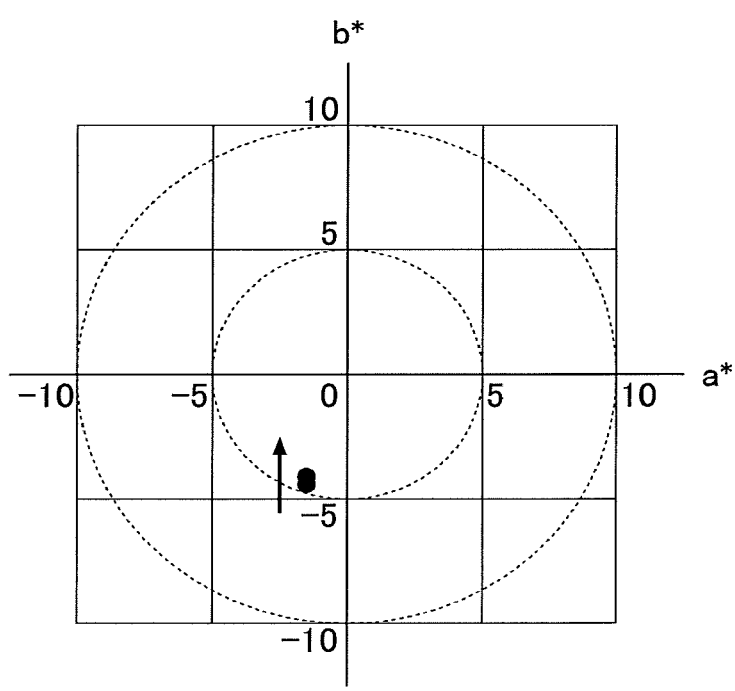
FIG. 6 is a diagram in which reflection colors before and after the abrasion process for the upper part layer are plotted in color coordinates in the color space for Sample 8.
Figure 7:
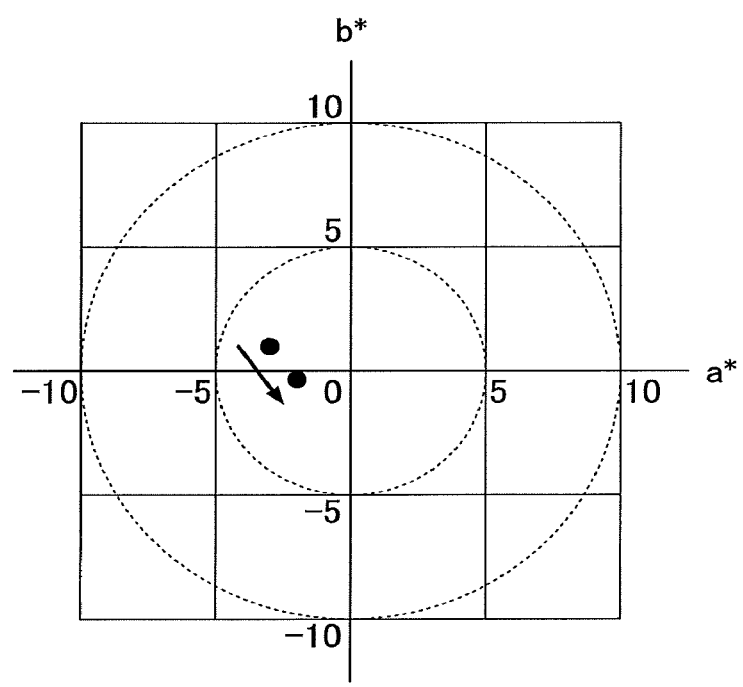
FIG. 7 is a diagram in which reflection colors before and after the abrasion process for the upper part layer are plotted in color coordinates in the color space for Sample 9.

Moreover, FIG. 5 illustrates color coordinates of reflection color before and after the abrasion process for the sample 7. FIG. 6 illustrates color coordinates of reflection color before and after the abrasion process for the sample 8. FIG. 7 illustrates color coordinates of reflection color before and after the abrasion process for the sample 9. In FIGS. 5-7, arrows indicate directions of change from coordinates before the abrasion process to coordinates after the abrasion process.

From the above-described results, it was found that for the samples 7 to 9, even if the upper part layer became thinner, there was almost no effect on reflection color.

Therefore, the heat insulating glass unit according to the embodiment is, upon being applied to a member that is subjected to wear due to repeated raising and lowering, such as a side glass member of a vehicle, considered to still have the effect of suppressing the angle dependence of reflection color, even if the upper part layer becomes thinner with time.

Example 7

A sample of the heat insulating glass unit (referred to as a "sample 10") was manufactured using the same method as the above-described example 1.

In Example 7, the first layer was a non-doped titania (titanium oxide) (refraction index at a wavelength of 630 nm was 2.4347). A thickness of the first layer was 6 nm. Moreover, a thickness of the second layer was 39 nm. The other conditions were the same as in the case of Example 1.

Example 8

A sample of the heat insulating glass unit (referred to as a "sample 11") was manufactured using the same method as Example 7. In Example 8, a thickness of an upper part layer was 95 nm. The other conditions were the same as in Example 7.

TABLE 15, in the following, shows the layer configurations of the samples 10 and 11 as a whole:

TABLE 15

| | layer configuration | | | | | |
|---|---|---|---|---|---|---|
| sample | glass plate | color tone compensation film | | transparent conductive layer | exfoliation preventing layer | upper part layer |
| | | first layer | second layer | | | |
| 10 | UVFL (3.5 mm) | titania (6 nm) | silica (39 nm) | ITO (150 nm) | — | silica (55 nm) |
| 11 | UVFL (3.5 mm) | titania (6 nm) | silica (39 nm) | ITO (150 nm) | — | silica (55 nm) |

(Evaluation)

Next, using the samples 10 to 11, using the above-described method, the angle dependence of reflection color was evaluated.

Results of measurements for the samples 10 and 11 are shown in the following TABLEs 16 and 17, respectively.

TABLE 16

| incident angle (°) | reflection color | | |
|---|---|---|---|
| | L* | a* | b* |
| 5 | 29.0071 | −0.0417 | −2.5307 |
| 10 | 29.0746 | −0.1149 | −2.4252 |
| 20 | 29.3377 | −0.3648 | −2.1251 |
| 30 | 30.0157 | −0.8204 | −1.7159 |
| 40 | 31.6179 | −1.3836 | −1.3714 |
| 50 | 35.1755 | −1.8323 | −1.1828 |
| 60 | 42.3594 | −2.0971 | −0.9123 |
| 70 | 55.0522 | −2.4187 | −0.2514 |
| 80 | 74.2457 | −2.5345 | 0.4542 |

TABLE 17

| incident angle (°) | reflection color | | |
|---|---|---|---|
| | L* | a* | b* |
| 5 | 23.5186 | −4.8379 | 1.8537 |
| 10 | 23.4632 | −4.7772 | 1.9588 |
| 20 | 23.4081 | −4.5978 | 2.2444 |
| 30 | 23.7383 | −4.3783 | 2.6517 |
| 40 | 25.2600 | −4.3081 | 3.0423 |

TABLE 17-continued

| incident angle (°) | reflection color | | |
|---|---|---|---|
| | L* | a* | b* |
| 50 | 29.3479 | −4.4411 | 3.0547 |
| 60 | 37.7794 | −4.5386 | 2.4706 |
| 70 | 52.1057 | −4.4285 | 1.7178 |
| 80 | 72.8166 | −3.7096 | 1.1729 |

Figure 8:
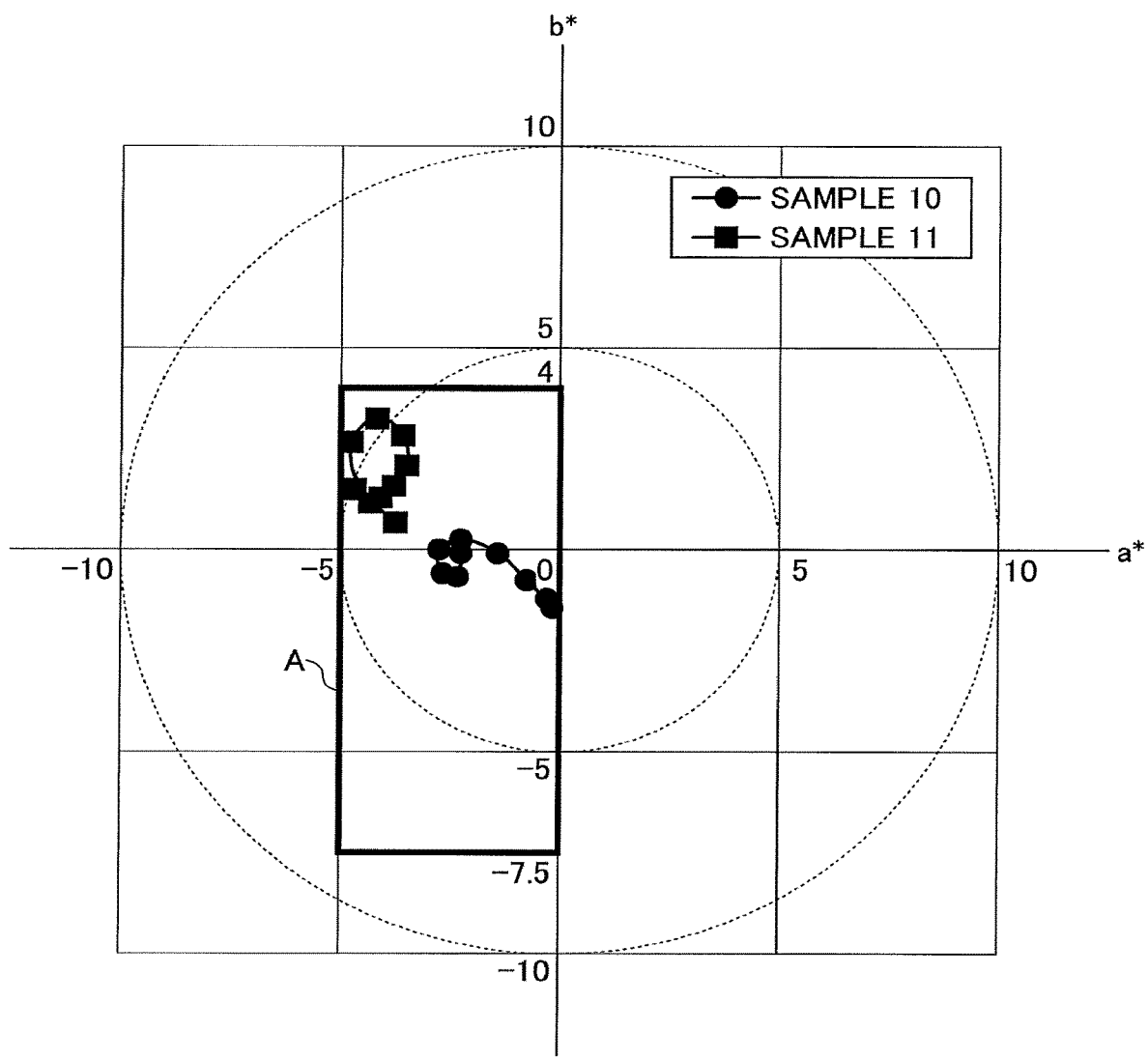
FIG. 8 is a diagram in which reflection colors occurring when irradiating with a light at respective incident angles are plotted in color coordinates in the color space for Samples 10 and 11.

FIG. 8 illustrates reflection color, which is generated upon irradiating with light at the respective incident angles, plotted in color coordinates in the color space for the samples 10 and 11.

From FIG. 8, it was found that for any of the samples 10 and 11, even if the incident angle changes from 5° to 80°, the color coordinate of the reflection color remains inside the region "A". Therefore, it was confirmed that for the samples 10 and 11, the angle dependence of reflection color from samples was significantly controlled.

In FIG. 8, it is found that for the sample 10, any of the reflection colors at the respective incident angles exist near the origin of the color coordinates. However, for the sample 11, the color coordinates at the respective incident angles tend to be biased to the upper left part with respect to the region "A", i.e. a region of thin yellow-green to thin yellow.

As described above, taking into account applying the heat insulating glass unit according to the present invention to a glass member for vehicle, reflection color of the heat insulating glass unit is preferably white to a color close to pale blue (the origin to a slight lower left region). In terms of such reflection color, it can be said that the sample 10 is preferred to the sample 11.

Moreover, in the sample 11, the reflection color tends to approach border lines that define the region "A" (specifically, a lower limit line of the a* value and an upper limit line of the b* value). According to the above-described property, when the thickness of the upper part layer is greater than 60 nm, as in the sample 10, it may be difficult to design the reflection color within a desired range. Therefore, it can be said that taking into account the ease of design of reflection color, the thickness of the upper part layer in the heat insulating glass unit is preferably 60 nm or less.

INDUSTRIAL APPLICABILITY

The present invention can be used for a glass member for vehicle, a window glass member of a building, and the like.

What is claimed is:

1. A heat insulating glass unit for vehicle comprising:
a glass plate;
a color tone compensation film arranged on at least one surface of the glass plate;
a transparent conductive layer arranged on the color tone compensation film, and mainly including an indium tin oxide (ITO); and
multilayer upper part layer arranged on the transparent conductive layer, having an overall refraction index for a light with a wavelength of 630 nm being 1.7 or less, and wherein said multilayer upper part layer comprises:
a first upper part layer arranged on an uppermost layer, having a refraction index being greater than 1.7, wherein the first upper part layer includes at least one selected from the group consisting of ZrBO, $Ta_2O_5$, $Nb_2O_5$, SiN, and BN; and
a second upper part layer arranged below the first upper part layer, a refraction index being 1.7 or less,
wherein the color tone compensation film has at least a first layer and a second layer,
wherein the first layer is arranged at a position closer to the glass plate than the second layer, wherein the first layer comprises silica-doped titanium oxide and a doped amount of silica is from 0.1 to 10 mass %, and
wherein a thickness of the second layer is greater than a thickness of the first layer, and
wherein a refraction index of the first layer for a light with a wavelength of 630 nm is greater than a refraction index of the second layer for a light with a wavelength of 630 nm.

2. The heat insulating glass unit for vehicle according to claim 1,
wherein the transparent conductive layer has a thickness in a range of 100 nm to 200 nm.

3. The heat insulating glass unit for vehicle according to claim 1,
wherein the multilayer upper part layer has a thickness of 60 nm or less.

4. The heat insulating glass unit for vehicle according to claim 1 further comprising:
an adhesion improving layer between the transparent conductive layer and the upper part layer.

5. The heat insulating glass unit for vehicle according to claim 1,
wherein the multilayer upper part layer further comprises $SiO_2$.

6. The heat insulating glass unit for vehicle according to claim 1,
wherein the first upper part layer comprises at least one selected from the group consisting of ZrBO, $Ta_2O_5$, and $Nb_2O_5$.

7. The heat insulating glass unit for vehicle according to claim 1,
wherein the second upper part layer mainly comprises $SiO_2$.

8. The heat insulating glass unit for vehicle according to claim 1,
wherein the first layer further comprises an oxide or an oxynitride which comprises at least one selected from the group consisting of Ti, Nb, Ta, Zn, Al, In, Si, and Zr.

9. The heat insulating glass unit for vehicle according to claim 1,
wherein the second layer mainly comprises $SiO_2$.

10. The heat insulating glass unit for vehicle according to claim 1,
wherein the first layer further comprises an oxide or an oxynitride which comprises at least one selected from the group consisting Ti, Nb, Ta, Zn, Al, In, Si, and Zr, and
wherein the second layer mainly comprises $SiO_2$.

11. The heat insulating glass unit for vehicle according to claim 1,
wherein an emissivity is 0.45 or less.

12. The heat insulating glass unit for vehicle according to claim 1, wherein the first upper part layer comprises ZrBO.

13. A heat insulating glass unit for vehicle comprising:
a glass plate;
a color tone compensation film arranged on at least one surface of the glass plate;
a transparent conductive layer arranged on the color tone compensation film, and mainly including an indium tin oxide (ITO); and
multilayer upper part layer arranged on the transparent conductive layer, having an overall refraction index for a light with a wavelength of 630 nm being 1.7 or less, and wherein said multilayer upper part layer comprises:
- a first upper part layer arranged on an uppermost layer, having a refraction index being greater than 1.7, wherein the first upper part layer includes at least one selected from the group consisting of ZrBO, $Ta_2O_5$, $Nb_2O_5$, SiN, and BN; and
- a second upper part layer arranged below the first upper part layer, a refraction index being 1.7 or less, wherein the color tone compensation film has at least a first layer and a second layer, wherein the first layer is arranged at a position closer to the glass plate than the second layer, wherein the first layer comprises silica-doped titanium oxide and a doped amount of silica is from 0.1 to 10 mass %, and wherein the first layer has a thickness of from 3 to 18 nm, and wherein a refraction index of the first layer for a light with a wavelength of 630 nm is greater than a refraction index of the second layer for a light with a wavelength of 630 nm.

14. The heat insulating glass unit for vehicle according to claim 13, wherein the second layer has a thickness of from 10 to 45 nm.

15. The heat insulating glass unit for vehicle according to claim 13,
wherein the transparent conductive layer has a thickness in a range of 100 nm to 200 nm.

16. The heat insulating glass unit for vehicle according to claim 13,
wherein the multilayer upper part layer has a thickness of 60 nm or less.

17. The heat insulating glass unit for vehicle according to claim 13, further comprising:
an adhesion improving layer between the transparent conductive layer and the upper part layer.

18. The heat insulating glass unit for vehicle according to claim 14, wherein a thickness of the transparent conductive layer is from 100 nm to 200 nm and a thickness of the upper part layer is 60 nm or less.

19. The heat insulating glass unit for vehicle according to claim 14, further comprising:
an adhesion improving layer between the transparent conductive layer and the upper part layer.

* * * * *